(12) United States Patent
Weiss et al.

(10) Patent No.: US 8,294,685 B2
(45) Date of Patent: *Oct. 23, 2012

(54) RECOGNIZING MULTIPLE INPUT POINT GESTURES

(75) Inventors: John Guido Atkins Weiss, Lake Forest Park, WA (US); Duncan, Camano Island, WA (US); Peter Vale, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/906,716

(22) Filed: Oct. 18, 2010

(65) Prior Publication Data
US 2011/0260986 A1    Oct. 27, 2011

Related U.S. Application Data

(63) Continuation of application No. 11/620,557, filed on Jan. 5, 2007, now Pat. No. 7,907,125.

(51) Int. Cl.
*G06F 3/041* (2006.01)
(52) U.S. Cl. ............... 345/173; 715/863; 178/18.01
(58) Field of Classification Search .......... 345/173–179; 715/863; 178/18.01
See application file for complete search history.

(56) References Cited

U.S. PATENT DOCUMENTS

| | | | |
|---|---|---|---|
| 5,543,590 A | | 8/1996 | Gillespie et al. |
| 5,796,406 A | * | 8/1998 | Shigematsu et al. .......... 715/863 |
| 5,825,352 A | * | 10/1998 | Bisset et al. ................ 345/173 |
| 5,943,043 A | * | 8/1999 | Furuhata et al. ............. 345/173 |
| 6,208,329 B1 | * | 3/2001 | Ballare ........................ 345/173 |
| 6,590,567 B1 | * | 7/2003 | Nagao et al. ................ 345/173 |
| 6,856,259 B1 | * | 2/2005 | Sharp .............................. 341/5 |
| 6,943,779 B2 | * | 9/2005 | Satoh .......................... 345/173 |
| 6,992,660 B2 | * | 1/2006 | Kawano et al. ............. 345/173 |
| 7,053,887 B2 | * | 5/2006 | Kraus et al. ................. 345/173 |
| 7,479,949 B2 | * | 1/2009 | Jobs et al. ................... 345/173 |
| 2005/0052427 A1 | | 3/2005 | Wu et al. |
| 2005/0057524 A1 | | 3/2005 | Hill et al. |
| 2005/0264541 A1 | | 12/2005 | Satoh |
| 2006/0026521 A1 | * | 2/2006 | Hotelling et al. ............ 715/702 |
| 2011/0157041 A1 | | 6/2011 | Weiss |

OTHER PUBLICATIONS

Lee, SK, et al., "A Multi-Touch Three Dimensional Touch-Sensitive Table", CHI'85 Proceedings, Apr. 1985, pp. 21-25.
Wu, Mike, et al., "Gesture Registration, Relaxation, and Reuse for Multi-Point Direct-Touch Surfaces", IEEE 2006.

(Continued)

*Primary Examiner* — Amare Mengistu
*Assistant Examiner* — Jennifer Zubajlo
(74) *Attorney, Agent, or Firm* — Workman Nydegger

(57) ABSTRACT

The present invention extends to methods, systems, and computer program products for recognizing multiple input point gestures. A recognition module receives an ordered set of points indicating that contacts have been detected in a specified order at multiple different locations on a multi-touch input surface. The recognition module determines the position of subsequently detected locations (e.g., third detected location) relative to (e.g., to the left of right of) line segments connecting previously detected locations (e.g., connecting first and second detected locations). The gesture module also detects whether line segments connecting subsequently detected locations (e.g., connecting third and fourth detected locations) intersect line segments connecting previously detected locations (e.g., connecting first and second detected locations). The gesture module recognizes an input gesture based on the relative positions and whether or not line segments intersect. The gesture module then identifies a corresponding input operation (e.g., cut, paste, etc.) to be performed.

20 Claims, 6 Drawing Sheets

OTHER PUBLICATIONS

Davis, James, et al, "Recognizing Hand Gestures", ECCV-94, Stockholm, Sweden, May 2-6, 1994.
Notice of Allowance mailed Sep. 16, 2010 for U.S. Appl. No. 11/620,557.
Office Action dated Apr. 29, 2010 cited in U.S. Appl. No. 11/620,557.
Office Action dated Jul. 6, 2012 in Application No. 12/949,627 (Copy Attached).

* cited by examiner

RECOGNIZING MULTIPLE INPUT POINT GESTURES

CROSS-REFERENCE TO RELATED APPLICATIONS

This application is a continuation of U.S. patent application Ser. No. 11/620,557, entitled "RECOGNIZING MULTIPLE INPUT POINT GESTURES", filed Jan. 5, 2007 now U.S. Pat. No. 7,907,125, which is herein incorporated by reference in its entirety.

BACKGROUND

1. Background and Relevant Art

Computer systems and related technology affect many aspects of daily life in society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

In many environments, a computer system typically includes a Central Processing Unit ("CPU"), system memory (e.g., Random Access Memory ("RAM"), some type of mass storage device (e.g., magnetic disk), input devices, and output devices. Input devices are used to accept user input to the computer system and relay that user input to the CPU. Output devices are used to present CPU output to the user. Thus, a user typically uses input devices to input data into a computer system, the input devices relay the input data to the CPU, the CPU processes the input data to generate corresponding output data (e.g., through system or application programs), the CPU sends the output data to the output devices, and the output devices present the output data.

Both input and output devices can include a combination of hardware (physical objects) and software (e.g., device drivers, user-interface controls) to implement their desired functionality. Specific to input devices, hardware devices, such as, for example, keyboards, mice, joysticks, etc., are used to receive input data. These or other hardware devices can be used to manipulate and navigate to user-interface controls (e.g., buttons, menus, etc) that have specified input functions. For example, a user can manipulate a mouse to move a cursor over a "print" button and click a mouse button to cause a document to print.

More recently, computer display devices have been configured to function both as an input device and a video output device. For example, computer display devices can be configured with touch surface mechanisms that facilitate the entry of input data through a display surface. Sensors (e.g., pressure sensors) embedded in the display surface can detect when objects (e.g., fingers) contact a particular location on the display surface. A computer system can then perform some action in response to detecting the contact. For example, in response to detecting contact between an object and a display surface at a location corresponding to user-interface control, a computer system can perform some action associated with the user-interface control.

Accordingly, input devices advantageously permit a user to meaningfully interact with a computer system. In many public and semi-public environments (e.g., libraries, restaurants, private clubs, airline courtesy rooms, etc.), computer systems (e.g., kiosks, table top computer systems, etc.) are made available to large numbers of users. Within these environments, it is often desirable to permit multiple users to use the same computer simultaneously to conserve space, computer system resources, etc. It is also often desirable to allow any simultaneous users to work collaboratively together or to work separately based on individual user needs or to work collaboratively together. For example, it may be desirable to allow multiple users to work collaboratively together on a presentation. On the other hand, it may also be desirable to allow a first user to browser the Internet, while a second user edits a word processing document.

Unfortunately, existing input device technologies have at least a few drawbacks when attempting to provide multi-user access (either collaboratively or individually) to the same computer system. For hardware devices, at least one device per user must typically be provided. For example, for multiple users to simultaneously perform different computing tasks, each user may require a separate keyboard and mouse. Thus, even though multiple computer systems are not utilized, there typically must be sufficient workspace to co-locate multiple sets of input devices per computer system.

For software, each instance of a user-interface control can consume a portion of a display surface. Further, multiple sets of user-interface controls must be displayed to provide corresponding multiple users with simultaneous computer access. Depending on the display area of the display surface, the number of presented sets of user-interface controls, and the number of supported users, existing display area can be crowded and potentially of limited use. Further, user-interface controls (e.g., a button) typically have a single (or "right-side up") orientation. Thus, when multiple users are working collaboratively, user-interface controls are properly oriented only for one of the multiple users. User-interface controls are also typically optimized for large finger sizes causing them to consume more display areas than may be needed for many users.

In some environments, motion based gesture recognition can be used in combination with a touch surface to receive input data. Software modules within a computer system can recognize motion based gestures made on the touch surface. For example, the software modules can track a user's finger(s) in constant contact with the touch surface as the user's finger(s) makes an arc, draws an outline, etc., When the user's finger(s) are no longer detected on the touch surface, the software modules can process the contact path to recognize a corresponding motion based gesture. Motion based gestures can correspond to pre-determined input functions. Thus, when the software modules detect a motion based gesture, the corresponding input function is performed in response to the motion based gesture. Accordingly, motion based gestures, at least to some extent, can alleviate the need for per user hardware input devices and can reduce the size of per user sets of user-interface controls.

However, recognition of motion based gestures is relatively complex. As a result, the motion tracking, coordinate buffering, algorithmic processing, etc. required to recognize a single motion based gesture can consume significant computer system resources (e.g., CPU cycles, system memory). Thus, attempting to recognize motion based gestures for multiple users (working either collaboratively or individually) at a single computer system can (potentially significantly) degrade system performance. For example, motion based gesture recognition, as well as other processes at the computer system, can take longer to complete due to limited resource availability.

BRIEF SUMMARY

The present invention extends to methods, systems, and computer program products for recognizing multiple input point gestures. A computer system including a multi-touch input surface receives an ordered set of points. The ordered set of points indicates that contact between an object and the multi-touch input surface was detected at a first location on the multi-touch input surface. The ordered set of points also indicates that contact between an object and the multi-touch input surface was detected at a second location on the multi-touch input surface simultaneously with the detected contact at the first location and subsequent to detecting contact with the multi-touch input surface at the first location. The ordered set of points also indicates that contact between an object and the multi-touch input surface was detected at a third location on the multi-touch input surface simultaneously with the detected contact at the first location and at the second location and subsequent to detecting contact with the multi-touch input surface at the second location.

The computer system calculates a line segment between the first location and the second location. The computer system determines that the third location is on a specified side of the line segment. The computer system recognizes an input gesture corresponding to detected contact at three or more locations on the multi-touch input surface based at least on the determination that the third location is on the specified side of the line segment.

Embodiments of the invention can also be used to recognize gestures for four or more input points. For example, the ordered set of points can also indicate that contact between an object and the multi-touch input surface was detected at a fourth location on the multi-touch input surface simultaneously with the detected contact at the first location, at the second location, and at the third location and subsequent to detecting contact with the multi-touch input surface at the third location. The computer system calculates a second line segment between the second location and the third location and a third line segment between the third location and the fourth location.

The computer system determines whether or not the fourth location is on the specified side of the second line segment. The computer system also detects whether or not the third line segment intersects with the first line segment. The computer system recognizes an input gesture corresponding to detected contact at four or more locations on the multi-touch input surface. Recognition is based at least on the determination of whether or not the fourth location is on the specified side of the second line segment and detecting whether or not the third line segment intersects with the first line segment.

Other similar embodiments are applicable to five or more input points.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
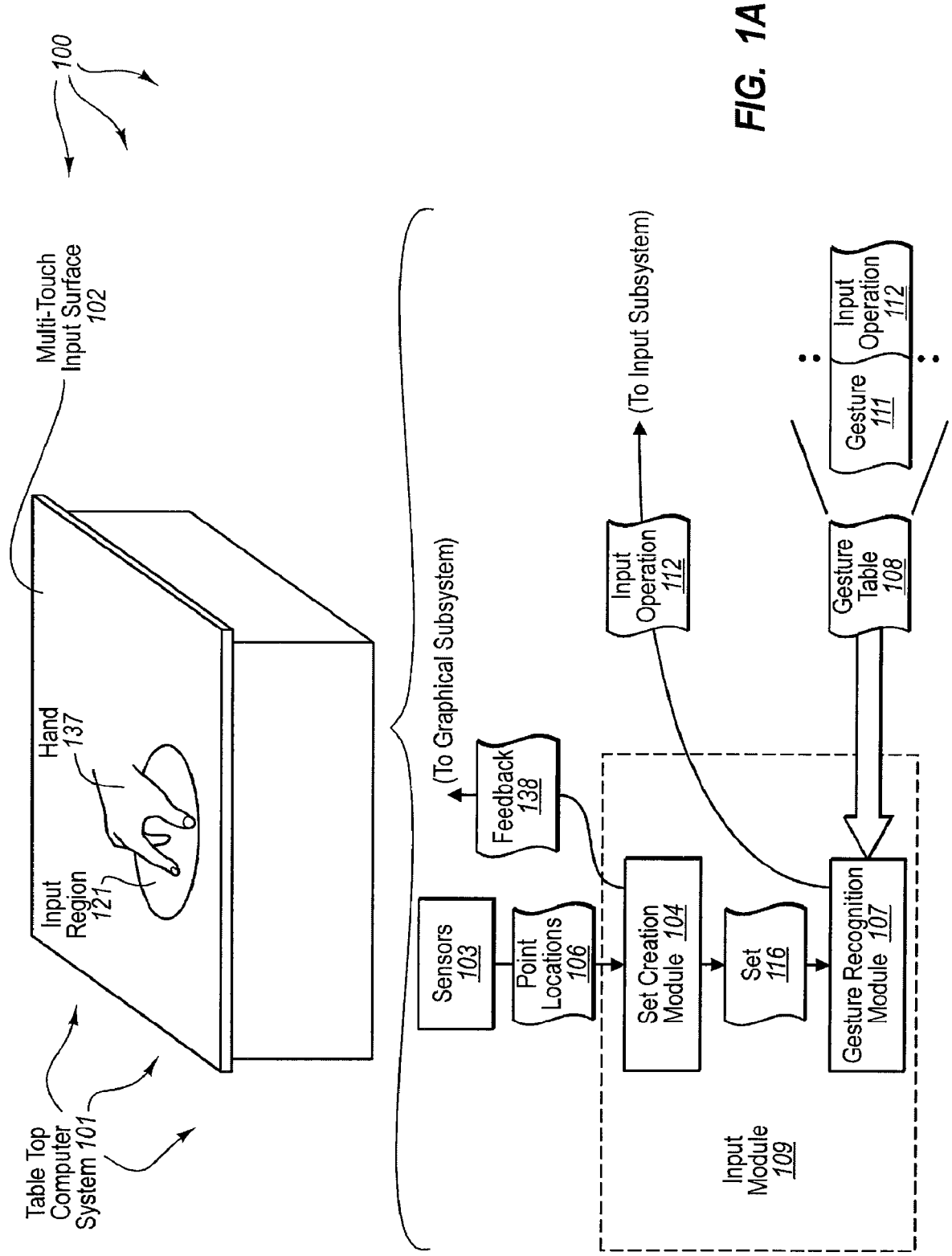
FIG. 1A illustrates an example computer architecture that facilitates recognizing multiple input point gestures.

The present invention extends to methods, systems, and computer program products for recognizing multiple input point gestures. A computer system including a multi-touch input surface receives an ordered set of points. The ordered set of points indicates that contact between an object and the multi-touch input surface was detected at a first location on the multi-touch input surface. The ordered set of points also indicates that contact between an object and the multi-touch input surface was detected at a second location on the multi-touch input surface simultaneously with the detected contact at the first location and subsequent to detecting contact with the multi-touch input surface at the first location. The ordered set of points also indicates that contact between an object and the multi-touch input surface was detected at a third location on the multi-touch input surface simultaneously with the detected contact at the first location and at the second location and subsequent to detecting contact with the multi-touch input surface at the second location.

The computer system calculates a line segment between the first location and the second location. The computer system determines that the third location is on a specified side of the line segment. The computer system recognizes an input gesture corresponding to detected contact at three or more locations on the multi-touch input surface based at least on the determination that the third location is on the specified side of the line segment.

Embodiments of the invention can also be used to recognize gestures for four or more input points. For example, the ordered set of points can also indicate that contact between an object and the multi-touch input surface was detected at a fourth location on the multi-touch input surface simultaneously with the detected contact at the first location, at the second location, and at the third location and subsequent to detecting contact with the multi-touch input surface at the third location. The computer system calculates a second line segment between the second location and the third location and a third line segment between the third location and the fourth location.

The computer system determines whether or not the fourth location is on the specified side of the second line segment. The computer system also detects whether or not the third line segment intersects with the first line segment. The computer system recognizes an input gesture corresponding to detected contact at four or more locations on the multi-touch input surface. Recognition is based at least on the determination of whether or not the fourth location is on the specified side of the second line segment and detecting whether or not the third line segment intersects with the first line segment.

Other similar embodiments are applicable to five or more input points.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, table top computers, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates recognizing multiple input point gestures. Depicted in computer architecture 100 table top computer system 101. Table top computer system includes sensors 103 and input module 109. Input module 109 further includes set creation module 104 and gesture recognition module 107.

Table top computer system 101 can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, the components of table top computer system 101 are configured to recognize multiple input point gestures made on multi-touch input surface 102.

Sensors 103 can be configured to detect when a physical object (e.g., a bottle, a glass, a finger, a hat, etc.) has come into physical contact with a portion of the multi-touch input surface 102. For example, sensors 103 can detect when a portion of hand 137 has come in contact with multi-touch input surface 102. Sensors 103 can be embedded in multi-touch input surface 102 and can include for example, pressure sensors, temperature sensors, image scanners, barcode scanners, etc., that interoperate with the components of input module 109 to recognize a multiple point input gesture and subsequently identify a corresponding input operation.

In some embodiments, multi-touch input surface 102 includes sensors for implementing a touch screen interface. For example, the multi-touch input surface can include an interactive multi-touch surface. Thus, it may be that multi-touch input surface 102 also functions as a presentation surface to display video output data to a user of table top computer system 101.

Sensors 103 can be included (e.g., embedded) in a plurality of locations across the multi-touch input surface 102. Sensors 103 can be configured to interoperation with set creation module 104 to create ordered sets of (input) points. Sensors 103 can differentiate locations where physical contact with the multi-touch input surface 102 has occurred. Thus, sensors 103 can differentiate between contact at a plurality of different locations on the multi-touch input surface 102 simultaneously.

Set creation module 104 can also be configured to provide the coordinate location (e.g., Cartesian position) for a point in response to detecting an object of some size surrounding the coordinate location. For example, when a finger (or thumb) contacts multi-touch input surface 102, contact can be detected over an area approximately equal to the finger (or thumb) tip of the finger (or thumb). Set creation module 104 can utilize geometric calculations to calculate an appropriate coordinate location for an input point based on a detected area of contact. For example, if a (e.g., finger tip) contact area was the general shape of an oval, a set of coordinates at or near the center of the oval can be calculated as the input point.

Gesture recognition module 107 is configured to receive an ordered set of points from set creation module and recognize an input gesture corresponding to the input points. From a recognized input gesture, gesture recognition module 107 can identify an input operation that is to be sent to an input subsystem of table top computer system 101.

Generally, an input point gesture is started by placing a finger (or thumb or some other form of contact) down on multi-touch input surface 102. The location where the first finger is placed is the first 'point' in the point gesture. Once a finger is in contact with the surface, the finger can remain stationary until the end of the gesture. Subsequently, one or more other fingers are consecutively placed onto the surface in different locations, adding more points to the point gesture. The meaning of the gesture can change based on the amount of points, the relative location of the points, and the order in which the points were added. The gesture is completed when all fingers are released from the input surface.

Figure 1B:
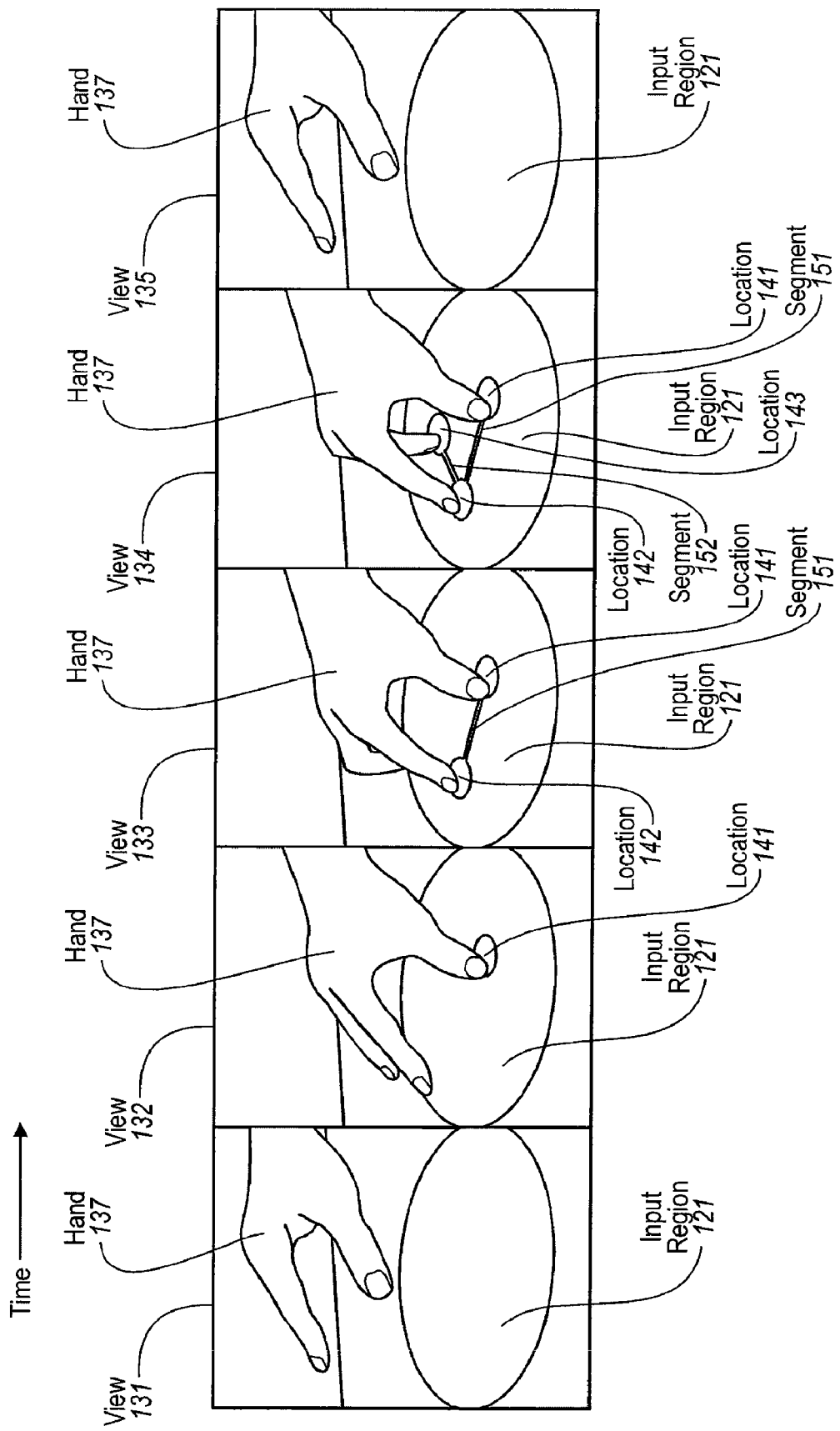
FIG. 1B illustrates a series of views of an input region of a multi-touch input surface depicting receiving points of an input gesture.

FIG. 1B illustrates a series of views of input region 121 (a portion of multi-touch input surface 102) depicting receiving points of an input gesture. The sequence of views is in chronological order starting with view 131 and ending with view 135. FIG. 1B will be described with some reference back to components of FIG. 1A.

In view 131, hand 137 is above input region 121 and no contact with multi-touch input surface 102 is detected.

In view 132, the thumb of hand 137 is placed in contact with multi-touch input surface 102 in proximity to location 141. Sensors 103 can detect the thumb contact and transfer the thumb contact area to set creation module 104. Set creation module 104 can calculate an appropriate coordinate location for an input point based on the thumb contact area. Set creation module 104 can then add the coordinate location to an ordered input set for the current gesture. Set creation module 104 can then provide feedback 138 (e.g., to a graphical subsystem) to cause multi-touch input surface 102 to indicate visually that the point has been added to the ordered input set. As depicted in view 132, visual feedback (e.g., a brightly colored circle) can be provided highlighting location 141. Feedback can be updated in essentially real time as new input points are detected.

In view 133, the index finger of hand 137 is placed in contact with multi-touch input surface 102 in proximity to location 142. Sensors 103 can detect the index finger contact and transfer the index finger contact area to set creation module 104. Set creation module 104 can calculate an appropriate coordinate location for a second input point based on the index finger contact area. Set creation module 104 can then add the second coordinate location to the ordered input set for the current gesture. Set creation module 104 can then provide updated feedback to cause multi-touch input surface 102 to indicate visually that the second point has been added to the ordered input set. As depicted in view 132, visual feedback (e.g., a brightly colored circle) can be provided highlighting location 142. Further visual feedback (e.g., a brightly colored line) can also be provided to highlight a line segment 151 connecting location 141 and location 142.

In view 134, the middle finger of hand 137 is placed in contact with multi-touch input surface 102 in proximity to location 143. Sensors 103 can detect the middle finger contact and transfer the middle finger contact area to set creation module 104. Set creation module 104 can calculate an appropriate coordinate location for a third input point based on the middle finger contact area. Set creation module 104 can then add the third coordinate location to the ordered input set for the current gesture. Set creation module 104 can then provide updated feedback to cause multi-touch input surface 102 to indicate visually that the third point has been added to the ordered input set. As depicted in view 134, visual feedback (e.g., a brightly colored circle) can be provided highlighting location 143. Further visual feedback (e.g., a brightly colored line) can also be provided to highlight a line segment 152 connecting location 142 and location 143.

In view 135, hand 137 is above input region 121 and no contact with multi-touch input surface 102 is detected. Ceasing to detect contact with multi-touch input surface 102 can indicate that the gesture is complete. In response, set creation module 104 can send the ordered set of input points to gesture recognition module 107.

Accordingly, in FIG. 1A, point locations 106 generally represent a set of detected points and feedback 138 generally represents feedback for highlighting those detected points on multi-touch input surface 102.

Figure 2:
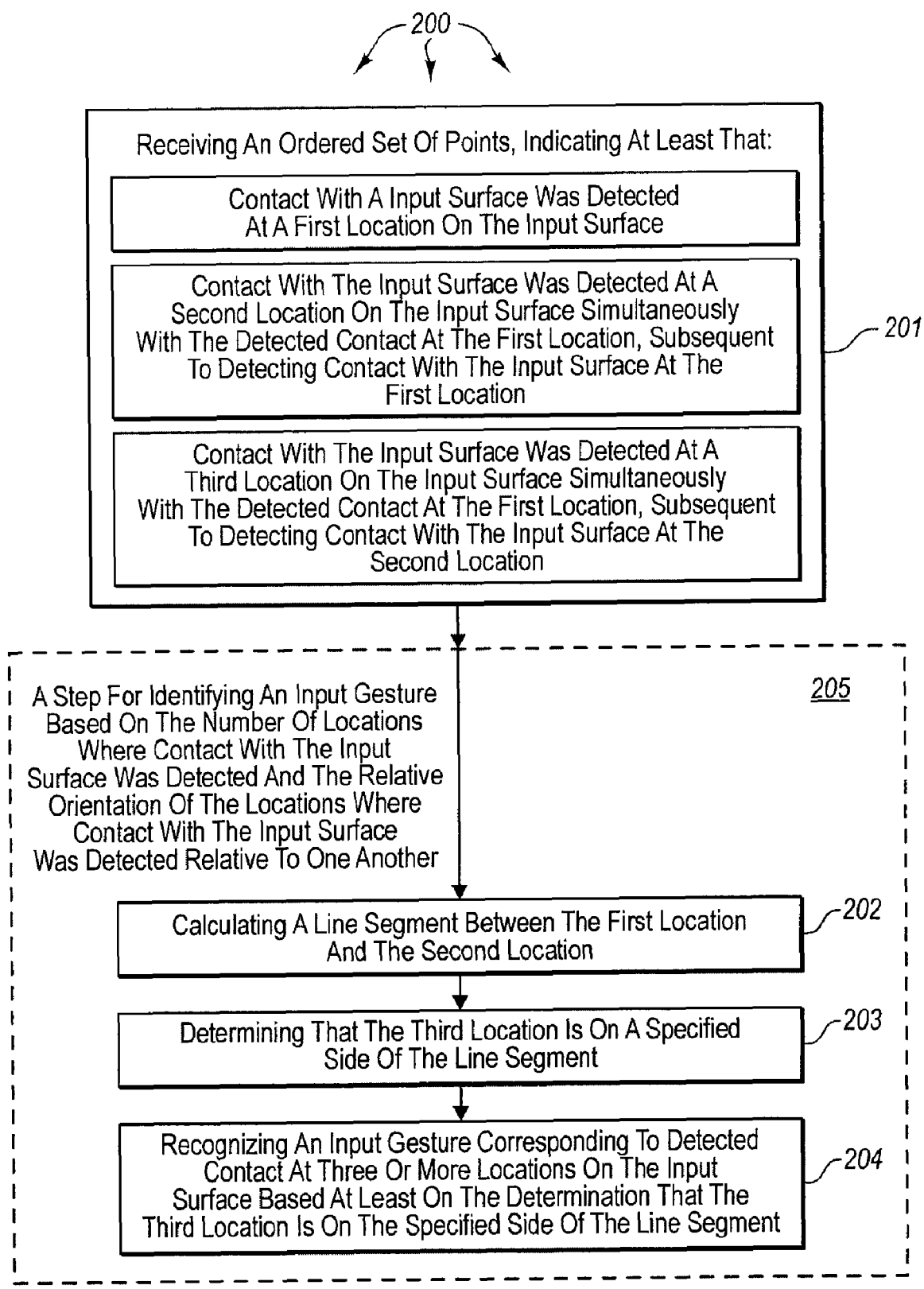
FIG. 2 illustrates a flowchart of a method for recognizing a multiple input point gesture.
Figure 3:
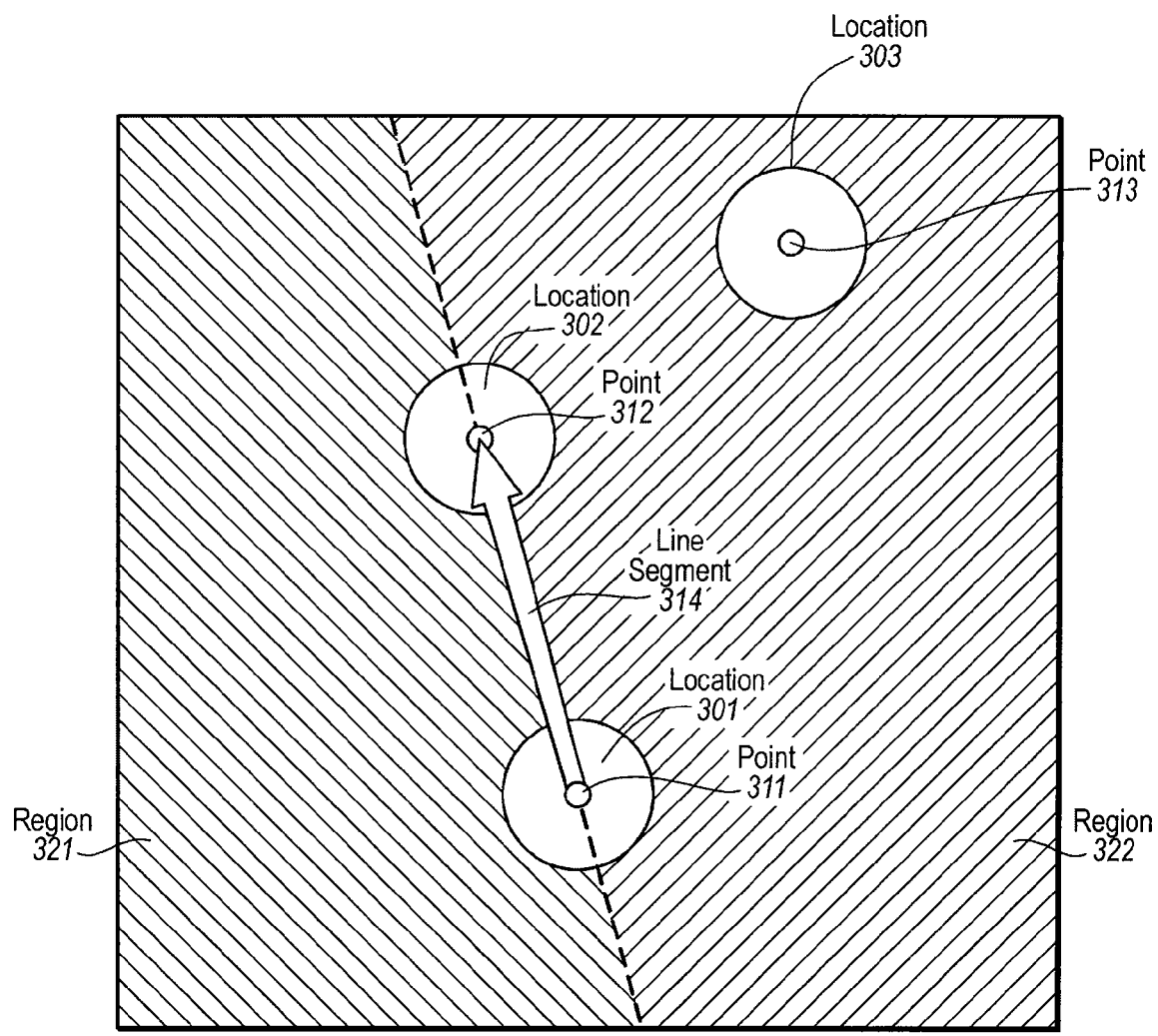
FIG. 3 illustrates a third point on a specified side of a line segment calculated between a first and a second point.

FIG. 2 illustrates a flowchart of a method 200 for recognizing a multiple input point gesture. FIG. 3 illustrates a third point on a specified side of a line segment calculated between a first and a second point. The method 200 will be described with respect to the components and data depicted in computer architecture 100 and the points in FIG. 3.

Method 200 includes an act of receiving an ordered set of points (act 201). The ordered set of points indicates at least that: a) contact with the multi-touch input surface was detected at a first location on the multi-touch input surface, b) contact with the multi-touch input surface was detected at a second location on the multi-touch input surface simultaneously with the detected contact at the first location, subsequent to detecting contact with the multi-touch input surface at the first location, and c) contact with the multi-touch input surface was detected at a third location on the multi-touch input surface simultaneously with the detected contact at the first location and at the second location, subsequent to detecting contact with the multi-touch input surface at the second location.

For example, gesture recognition module 107 can receive set 116 from set creation module 104. Set 116 can include a set of input points detected from a plurality of fingers (or a thumb and one or more fingers) of hand 137 touching multi-touch surface 102.

Method 200 includes a result oriented step for identifying an input gesture based on the number of locations where contact with the multi-touch input surface was detected and the relative orientation of the locations where contact with the multi-touch input surface was detected relative to one another (step 205). Functional, result-oriented step 205 may be accomplished via any suitable corresponding acts. However, in FIG. 2, the step 205 includes corresponding acts 202, 203, and 204.

Thus, step 205 includes a corresponding act of calculating a line segment between the first location and the second location (act 202). For example, gesture recognition module 107 can calculate a line segment between the first and second detected points included in set 116.

Referring now to FIG. 3, gesture recognition module 107 can calculate line segment 314 from point 311 to point 312. Points 311 and 312 can be Cartesian coordinates on multi-touch input surface 102. Points 311 and 312 can be calculated as appropriate points for contact with multi-touch input surface 102 detected at or near locations 301 and 302 respectively.

Step 205 also includes a corresponding act of determining that the third location is on a specified side of the line segment (act 203). For example, gesture recognition module 207 can determine that a third detected point in set 116 is to the right or to the left of line segment between the first and second detected points in set 116.

Referring again to FIG. 3, gesture recognition module 107 can determine that point 313 is to the right of line segment 314. Point 314 can be Cartesian coordinates on multi-touch input surface 102. Point 314 can be calculated as an appropriate point for contact with multi-touch input surface 102 detected at or near location 303.

In some embodiments, a line segment is extended to assist in determining what side of a line segment a point is on. For example in FIG. 3, as depicted by the dashed lines, line segment 314 can be extended in both directions. Region 321 indicates points to the left of line segment 314 and region 322 indicates points to the right of line segment 314. When a third point is detected to be on a line segment between a first and second point (or extension thereof), default behavior can be applied to place the third point to the left or right of the line segment as desired.

Step 205 also includes a corresponding act of recognizing an input gesture corresponding to detected contact at three or more locations on the multi-touch input surface based at least on the determination that the third location is on the specified side of the line segment (act 204). For example, gesture recognition module 107 can recognize an input gesture corresponding to detected contact at three or more locations on multi-touch input surface 102. Gesture recognition module 107 can base the determination at least on whether a third detected point in set 116 is to the left or right of a line segment between the first and second detected points in set 116. If the third detected point is on the right of the line segment, gesture recognition module 107 can recognize a first gesture. On the other hand, if the third detected point is on the left of the line segment, gesture recognition module 107 can recognize a second different gesture.

As the number of input points increases so does the number of unique input gestures that can be generate based on the number of points. Table 1 depicts the number of possible gestures for 1, 2, 3, 4, and 5 input points.

TABLE 1

| Number of Points | Possible Gestures |
| --- | --- |
| 1 point | 1 possible point gesture |
| 2 points | 1 possible point gesture |
| 3 points | 2 possible point gestures |
| 4 points | 6 possible point gestures |
| 5 points | 22 possible point gestures |

Thus, using five or fewer points a total of 32 different gestures are possible.

Figure 4:
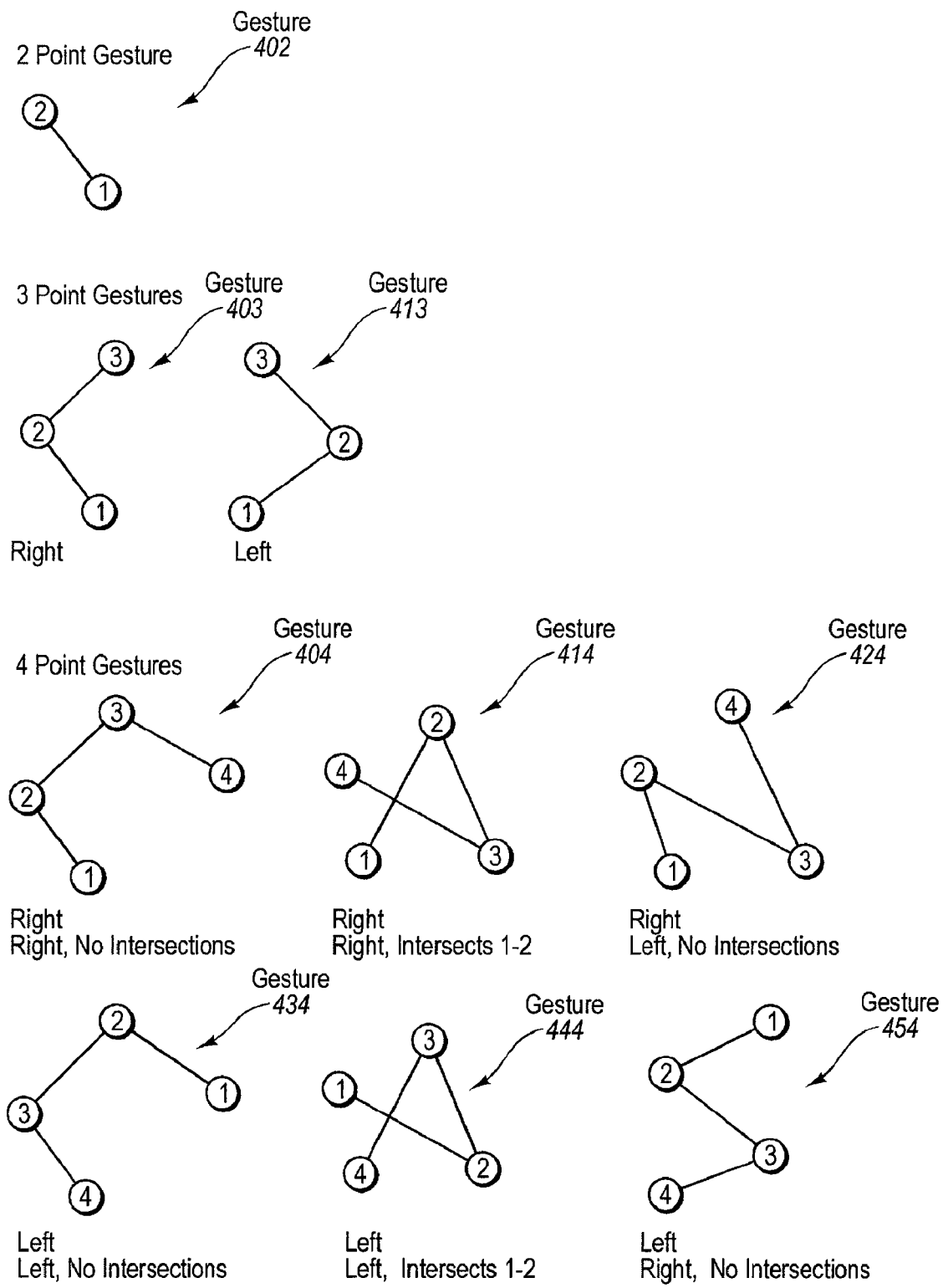
FIG. 4 illustrates various multiple input point gestures.

FIG. 4 illustrates various multiple input point gestures. FIG. 4 depicts two, three, and four point gestures. Numbers within the depicted points indicate the order in which the points were detected. That is, 1 is detected first, 2 is detected second, 3 is detected third, and 4 is detected fourth.

As depicted, gesture 402 can be recognized based on two input points. Either of gestures 403 or 413 can be recognized based on three input points. Gesture 403 can be recognized when the third detected point is to the right of the line segment connecting the first and second detected points. On the other hand, gesture 413 can be recognized when the third detected point is to the left of the line segment connecting the first and second detected points.

Any of gestures 404, 414, 424, 434, 444, and 454 can be recognized based on four input points. Detection of four point gestures can include determining whether the fourth detected point is to the right or left of a second line segment connecting the second and third detected points. Detection of four point gestures can also include determining whether a third line segment connecting the third and fourth detected points intersects the line segment connecting the first and second detected points.

For example, gesture 404 can be recognized when the third detected point is to the right of line segment connecting the first and second detected points, the fourth detected point is to the right of a second line segment connecting the second and third detected points (relative to the second line segment), and a third line segment connecting the third and fourth detected points does not intersect the line segment connecting the first and second detected points.

Gesture 414 can be recognized when the third detected point is to the right of line segment connecting the first and second detected points, the fourth detected point is to the right of a second line segment connecting the second and third detected points (relative to the second line segment), and a third line segment connecting the third and fourth detected points intersects the line segment connecting the first and second detected points.

Gesture 424 can be recognized when the third detected point is to the right of line segment connecting the first and second detected points, the fourth detected point is to the left of a second line segment connecting the second and third detected points (relative to the second line segment), and a third line segment connecting the third and fourth detected points does not intersect the line segment connecting the first and second detected points.

Gesture 434 can be recognized when the third detected point is to the left of line segment connecting the first and second detected points, the fourth detected point is to the left of a second line segment connecting the second and third detected points (relative to the second line segment), and a third line segment connecting the third and fourth detected points does not intersect the line segment connecting the first and second detected points.

Gesture 444 can be recognized when the third detected point is to the left of line segment connecting the first and second detected points, the fourth detected point is to the left of a second line segment connecting the second and third detected points (relative to the second line segment), and a third line segment connecting the third and fourth detected points intersects the line segment connecting the first and second detected points.

Gesture 454 can be recognized when the third detected point is to the left of line segment connecting the first and second detected points, the fourth detected point is to the right of a second line segment connecting the second and third detected points (relative to the second line segment), and a third line segment connecting the third and fourth detected points does not intersect the line segment connecting the first and second detected points.

Thus, as depicted in FIG. 4, embodiments of the invention can also be used to recognize gestures for four or more input points.

Accordingly, step 205 can include a corresponding act of receiving an ordered set of points indicating that contact with the multi-touch input surface was detected at a fourth location on the multi-touch input surface simultaneously with the detected contact at the first location, at the second location, and at the third location, subsequent to detecting contact with the multi-touch input surface at the third location. For example, set 116 can also indicate that contact between an object and multi-touch input surface 102 was detected at a fourth location on the multi-touch input surface 102 simultaneously with the detected contact at the first location, at the second location, and at the third location and subsequent to detecting contact with multi-touch input surface 102 at the third location.

Step 205 can include a corresponding act of calculating a second line segment between the second location and the third location. For example, gesture recognition module 107 can calculate a second line segment between the second and third detected points included in set 116.

Step 205 can include a corresponding act of determining whether or not the fourth location is on the specified side of the second line segment. For example, gesture recognition module 107 can determine that the fourth location on multi-touch input surface 102 is to the left of the second line segment connecting the second and third locations (relative to the second line segment) on multi-touch input surface 102.

Step 205 can include a corresponding act of calculating a third line segment between the third location and the fourth location. For example, gesture recognition module 107 can calculate a third line segment between the third and fourth detected points included in set 116.

Step 205 can include a corresponding act of detecting whether or not the third line segment intersects with the first line segment. For example, gesture recognition module 107 can detect if the third line segment between the third and fourth detected points included in set 116 intersects the line segment between the first and second detected points included in set 116.

Step 205 can include a corresponding act of recognizing an input gesture corresponding to detected contact at four or more locations on the multi-touch input surface. Recognition is based at least on the determination of whether or not the fourth location is on the specified side of the second line segment and detecting whether or not the third line segment intersects with the first line segment. For example, gesture recognition module 107 can recognize a corresponding four point gesture detected on multi-touch input surface 102 based on whether the fourth detected point is to the left or right of the second line segment connecting the second and third detected points (relative to the second line segment). Gesture recognition module 107 can also recognize a corresponding four point gesture detected on multi-touch input surface 102 based on whether or not whether the third line segment intersects with the first line segment.

Further embodiments can be used to recognize various different gestures having five or more input points. For example, gesture recognition module 107 can check to determine whether a fifth detected point is to the right or left of the third line segment. Gesture recognition module 107 can also detect whether a fourth line segment connecting the fourth and fifth detected points cross either of both of the first and second line segments. Gesture recognition module 107 can combine determination of a left or right side for the fifth point and intersection data for the fourth line segment with previously generated data for the first through fourth detected points to recognize a unique five point input gesture.

Gesture recognition module 107 can be configured to recognize unique input gestures for virtually any number of input points. Thus, gesture recognition based on six, seven, eight, nine, ten, twenty, thirty, or more points is possible.

Step 205 can include a corresponding act of looking up the meaning of the input gesture in a table of known input gestures. For example, gesture recognition module 107 may identify gesture 111 from set 116. Subsequently, gesture recognition module 107 can identify an input related operation that corresponds to input gesture 111. For example, gesture recognition module 107 can refer to gesture table 108 to identify that input operation 112 corresponds to gesture 111. That is, when gesture 111 is recognized, a user of table top computer system 101 is requesting (through their input of points) that input operation 112 be performed.

The different meanings applied to gestures can vary according to context. Listed below are a few examples of different contexts and applications:

1. Cut and Paste and Other Common Tasks

The two three-point-gestures could be a substitute for the keyboard shortcut commands for Cut and Paste. Right could be used for control-C because the gesture resembles a "C" and Left could be used for control-V because the gesture resembles a "V." Executing these gestures also feels quite similar to executing keyboard shortcuts.

2. Wizard Commands for a Role Playing Game

Each point gesture could be a command for a unique spell that a wizard avatar can cast. Users would be encouraged to learn more complex commands to improve their skills at the game-perhaps the points of an offensive spell when touched in the opposite order will trigger a defensive spell. For example, Three-point right is a fire spell, and Three-point left is an ice shield.

3. Photo/Graphics Editing Application

The location data of each point in the gesture can be made available to client applications. In a graphics application, a "4-point right, right, no intersection" could rotate the closest graphic element to the initial point in the gesture (or the center of the gesture) by 90 degrees clockwise. Similarly, a "4-point left, left, no intersection" could perform the same function but with counter-clockwise rotation.

Further, the parameters of multiple input point gestures can be adjusted according to the needs of the application. For example, various optional parameters can be considered when performing gesture recognition. Optional parameters can include but are not limited to: significance of point order, presence of a graphical user interface where points of gesture must be entered, presence of a single point of orientation about which points of gesture are measured (might be center of screen, may or may not be a visible point), significance of pressing and releasing points in the gesture, significance of speed in which the gesture is executed, significance of physical size of gesture, and significance of orientation of gesture.

In some embodiments, a gesture is recognized or identified based on detected contact at a number of locations on an input surface without regard for the order in which contact was detected. Thus, there can be a number of unique gestures equal to the number of possible simultaneous locations that can be contacted. For example, using a single human hand five unique gestures may be possible: a one point gesture, a two point gesture, a three point gesture, a four point gesture, and a five point gesture.

Using a single hand, a one point gesture can be recognized when one finger (or thumb) is simultaneously detected on an input surface and then released. Using a single hand, a two point gesture can be recognized when two fingers (or a finger and a thumb) are simultaneously detected on the input surface and then released. A two finger press and release can be recognized or identified as a "double-click" command similar to that entered when pressing a mouse button twice in quick succession.

Using a single hand, a three point gesture can be recognized when three fingers (or two fingers and a thumb) are simultaneously detected on the input surface and then released. Using a single hand, four point gesture can be recognized when four fingers (or three fingers and a thumb)

simultaneously detected on the input surface and then released. Using a single hand, a five point gesture can be recognized when four fingers and a thumb are simultaneously detected on the input surface and then released.

Figure 5:
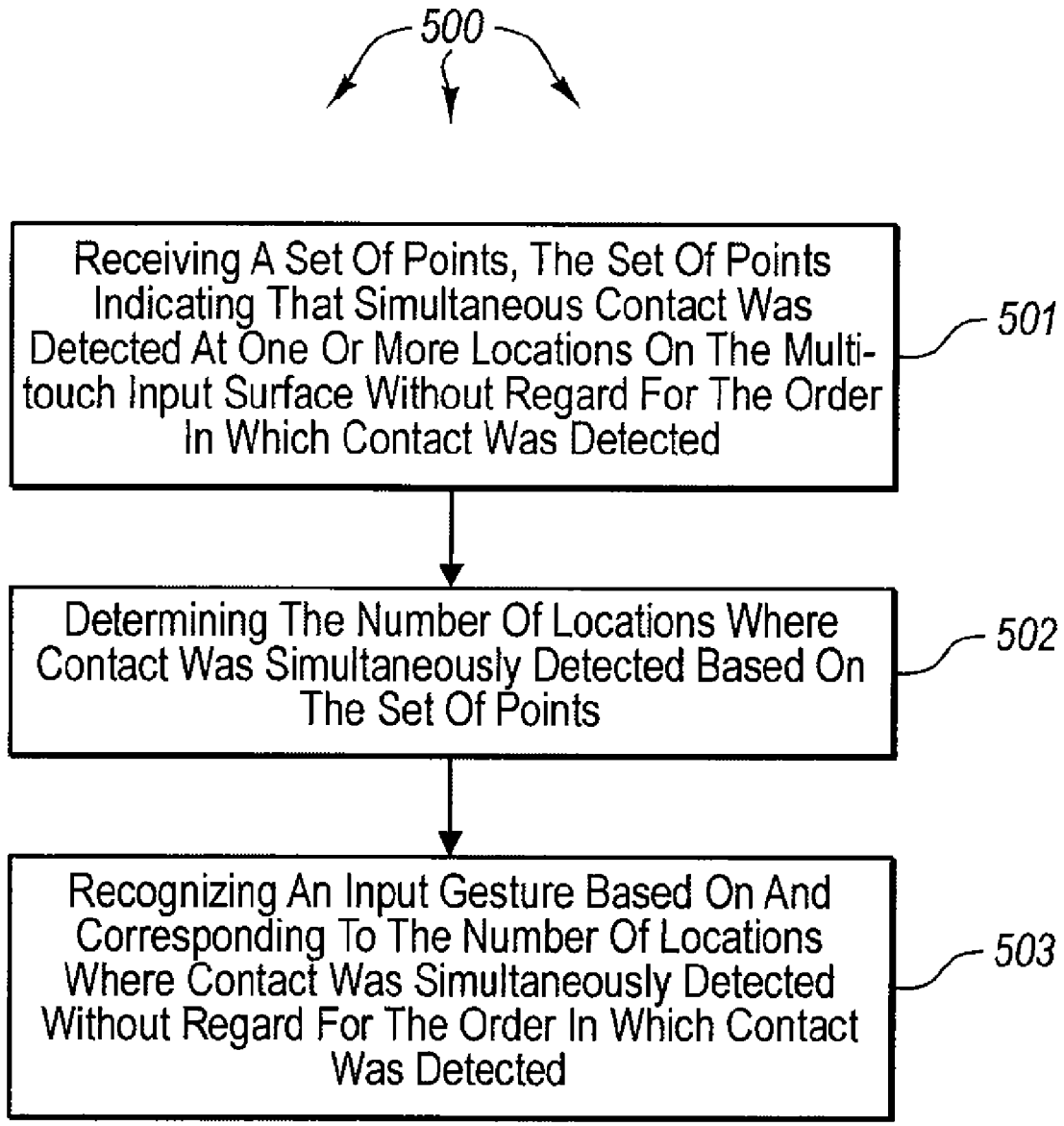
FIG. 5 illustrates a flowchart of another method for recognizing a multiple input point gesture.

FIG. 5 illustrates a flowchart of another method 500 for recognizing a multiple input point gesture. The method 500 will be described with respect to the components and data depicted in computer architecture 100.

Method 500 includes an act of receiving a set of points, the set of points indicating that simultaneous contact was detected at one or more locations on the multi-touch input surface without regard for the order in which contact was detected (act 501). For example, gesture recognition module 107 can receive set 116. In these embodiments, set 116 can be an unordered set that simply indicates that contact was simultaneously detected at one or more locations on multi-touch input surface 102.

Method 500 includes an act of determining the number of locations where contact was simultaneously detected based on the set of points (act 502). For example, based on set 116 gesture recognition module 107 can determine the number of locations (e.g., one, two, three, four, five, etc.) where contact was simultaneously detected on multi-touch input surface 102.

Method 500 includes an act of recognizing an input gesture based on and corresponding to the number of locations where contact was simultaneously detected without regard for the order in which contact was detected (act 503). For example, based on the number of locations where contact was simultaneously detected on multi-touch input surface 102, gesture recognition module 107 can recognize an input gesture that corresponds to the number of locations. Thus, if simultaneous contact is detected at two locations (in any order), gesture recognition module 107 can recognize an input gesture corresponding to simultaneous contact at two locations. Likewise, if simultaneous contact is detected at three, four, or five locations (in any order), gesture recognition module 107 can recognize an input gesture corresponding to simultaneous contact at three, four, or five locations respectively.

Other embodiments can include the recognition or identification of gestures entered with two hands (i.e., up to 10 points). In these other embodiments, the order of detection can be used as a parameter in recognition or identification of gestures to increase the number of possible unique gestures. On the other hand, the order of detection may not be used as a parameter in recognition or identification of gestures to reduce the number of possible unique gestures.

Thus, embodiments of the present invention can accommodate multiple users without having to add additional hardware devices to a computer system. Gestures can also be orientation independent, permitting users to be in any position relative to a multi-touch input surface. Further, since gestures are based on points, gestures can be entered and processed more efficiently. Accordingly, using only fingers (or similar tools) on a touched based multi-touch input surface, multiple input point gestures facilitate quickly communicating different commands to a computer system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for use at a computer system, the computer system including a processor and system memory, the method for recognizing a multiple input point gesture, the method comprising:
   an act of receiving a sequenced order of point locations, the sequenced order of point locations indicating contact at a first location on an input surface, followed by simultaneous contact at the first location and a second location on the input surface, followed by simultaneous contact at the first location, the second location, and a third location on the input surface;
   an act of calculating a line segment between the first location and the second location;
   an act of determining that the third location is on a specified side of the line segment; and
   an act of the processor recognizing an input gesture represented by the sequenced order of point locations based at least on the determination that the third location is on the specified side of the line segment.

2. The method as recited in claim 1, wherein of receiving a sequenced order of point locations comprises an act of receiving a sequenced order of point locations indicating that simultaneous contact at the first location, the second location, and the third location was followed by simultaneous contact at the first location, the second location, the third location, and a fourth location on the input surface; and further comprising:
   an act of calculating a second line segment between the second location and the third location; and
   an act of calculating a third line segment between the third location and the fourth location.

3. The method as recited in claim 2, further comprising:
   an act of determining that the fourth location is on the specified side of the second line segment.

4. The method as recited in claim 3, further comprising:
   an act of detecting that the third line segment intersects with the first line segment.

5. The method as recited in claim 4, wherein the act of recognizing an input gesture represented by the sequenced order of point locations comprises an act of recognizing an input gesture corresponding to detected contact at four or more locations on the input surface based at least on the determination that the fourth location is on the specified side of the second line segment and that the third line segment intersects with the first line segment.

6. The method as recited in claim 3, further comprising:
   an act of detecting that the third line segment does not intersect with the first line segment.

7. The method as recited in claim 6, wherein the act of recognizing an input gesture represented by the sequenced order of point locations comprises an act of recognizing an input gesture corresponding to detected contact at four or more locations on the input surface based at least on the determination that the fourth location is on the specified side of the second line segment and that the third line segment does not intersect with the first line segment.

8. The method as recited in claim 2, further comprising:
   an act of determining that the fourth location is not on the specified side of the second line segment.

9. The method as recited in claim 8, wherein the act of recognizing an input gesture represented by sequenced order of point locations comprises an act of recognizing an input gesture corresponding to detected contact at four or more locations on the input surface based at least on the determination that the fourth location is not on the specified side of the second line segment.

10. The method as recited in claim 1, wherein the act of recognizing an input gesture represented by the sequenced order of point locations comprises an act of recognizing a corresponding input gesture corresponding to detected contact at five locations on the input surface.

11. The method as recited in claim 1, wherein the act of recognizing an input gesture represented by the sequenced order of point locations comprises an act of recognizing an input gesture corresponding to detected contact at three or more locations on the input surface based on the order of the detected contact at the three or more locations.

12. The method as recited in claim 1, further comprising an act of looking up the meaning of the input gesture in a table of known input gestures.

13. A computer program product for use at a computer system including an input surface, the computer program product for implementing a method for recognizing a multiple input point gesture on the input surface, the computer program product comprising one or more computer storage media having stored thereon computer-executable instructions that, when executed at a processor, cause the computer system to perform the method, including the following:
   receive a sequenced order of point locations, the sequenced order of point locations indicating contact at a first location on the input surface, followed by simultaneous contact at the first location and a second location on the input surface, followed by simultaneous contact at the first location, the second location, and a third location on the input surface;
   calculate a line segment between the first location and the second location;
   determine that the third location is on a specified side of the line segment; and
   recognize an input gesture represented by the sequenced order of point locations based at least on the determination that the third location is on the specified side of the line segment.

14. The computer program product as recited in claim 13, wherein computer-executable instructions that, when executed, cause the computer system to receive a sequenced order of point locations comprise computer-executable instructions that, when executed at a processor, cause the computer system to receive a sequenced order of point locations indicating that simultaneous contact at the first location, the second location, and the third location was followed by simultaneous contact at the first location, the second location, the third location, and a fourth location on the input surface.

15. The computer program product as recited in claim 14, wherein computer-executable instructions that, when executed, cause the computer system to recognize an input gesture represented by the sequenced order of point locations comprise computer-executable instructions that, when executed, cause the computer system to recognize an input gesture based in part on the fourth location.

16. The computer program product as recited in claim 14, wherein computer-executable instructions that, when executed, cause the computer system to receive a sequenced order of point locations indicating that simultaneous contact at the first location, the second location, and the third location was followed by simultaneous contact at the first location, the second location, the third location, and a fourth location on the input surface comprise computer-executable instructions that, when executed, cause the computer system to receive a sequenced order of point locations indicating that simultaneous contact at the first location, the second location, the third location, and the fourth location was followed by simultaneous contact at the first location, the second location, the third location, the fourth location, and a fifth location on the input surface.

17. The computer program product as recited in claim 13, wherein computer-executable instructions that, when executed, cause the computer system to recognize an input gesture represented by the sequenced order of point locations comprise computer-executable instructions that, when executed, cause the computer system to recognize an input gesture corresponding to detected contact at four or more locations on the input surface.

18. The computer program product as recited in claim 13, wherein computer-executable instructions that, when executed, cause the computer system to recognize an input gesture corresponding to detected contact at four or more locations on the input surface comprise computer-executable instructions that, when executed, cause the computer system to recognize an input gesture corresponding to detected contact at five locations on the input surface.

19. The computer program product as recited in claim 13, further comprising computer-executable instructions that, when executed, cause the computer system to look up the meaning of the recognized input gesture in a table of known input gestures.

20. A computer system, the computer system comprising:
   one or more processors;
   system memory;
   an input surface; and
   a gesture recognition module, the gesture recognition module configured to:
      receive a sequenced order of point locations, the sequenced order of point locations indicating contact at a first location on the input surface, followed by simultaneous contact at the first location and a second location on the input surface, followed by simultaneous contact at the first location, the second location, and a third location on the input surface;
      calculate a line segment between the first location and the second location;
      determine that the third location is on a specified side of the line segment; and
      recognize an input gesture represented by the sequenced order of point locations based at least on the determination that the third location is on the specified side of the line segment.

* * * * *